United States Patent Office
2,990,410
Patented June 27, 1961

2,990,410
PROCESS FOR PREPARING 2-OXOADIPIC ACID
Milon W. Bullock, Pearl River, N.Y., and John J. Hand, New Milford, N.J., assignors to American Cyanamid Company, New York, N.Y., a corporation of Maine
No Drawing. Filed Dec. 24, 1958, Ser. No. 782,683
11 Claims. (Cl. 260—343.5)

This invention relates to an improved process for producing 2-oxoadipic acid, a new intermediate therefor and an improved process of producing pure starting material.

2-oxoadipic acid, often called α-ketoadipic acid, has achieved considerable practical importance as a result of the development by Broquist, Brockman and Stiffey of a practical process of producing L-lysine by the fermentation of yeasts in media to which 2-oxoadipic acid has been added as a precursor. Although 2-oxoadipic acid is a very old compound and has been known for half a century, the processes of making it were expensive and its cost, therefore, was high. Since low cost 2-oxoadipic acid is essential for the practical exploitation of the Broquist, Brockman and Stiffey process referred to above, there has been a serious need for an improved process by which 2-oxoadipic acid could be prepared simply and economically on a large scale.

The first practical process for the commercial production of 2-oxoadipic acid is described and claimed in our copending application, Serial No. 679,061, filed August 19, 1957, now U.S. 2,883,420. This process started with a known compound 2-carbalkoxycyclopentanone. The process involved ozonolysis in acetic acid to produce an ozone reaction product of as yet unknown constitution which on reduction, for example by means of hydrogen and a palladium catalyst, was transformed into 5-carbalkoxy-5-oxovaleric acid. This was then hydrolyzed to remove the remaining ester group and produce 2-oxoadipic acid. The present invention constitutes an improvement over our prior process referred to above. Essentially, the improvement comprises the ozonolysis of 2-carbalkoxycyclopentanone in acetic anhydride instead of acetic acid. This produces a different reaction product, the constitution of which is not known except that it is known that it is not the same product as is obtained in our prior process by the treatment of the 2-carbalkoxycyclopentanone in acetic acid. On reduction, for example with hydrogen and a palladium on a charcoal catalyst, an entirely different compound is produced, namely the alkyl ester of 3,4-dihydro-α-pyrone-6-carboxylic acid. These compounds are new chemical compounds and are readily hydrolyzed in good yield under mild conditions to 2-oxoadipic acid. The new intermediates are included in the scope of the present invention. The invention also includes the sequence of steps in producing 2-oxoadipic acid from 2-carbalkoxycyclopentanone for it is an advantage of the process aspect of the present invention that it is not necessary to isolate and purify the dihydropyrone carboxylates and on the contrary, a crude reaction mixture obtained simply by removing the palladium and charcoal catalyst and the acetic anhydride may be used just as effectively as the pure compound.

Both the process of the present invention and that of our copending application above referred to are effected by the purity of the 2-carbalkoxycyclopentanone used as the raw material. In both processes, therefore, it is desirable to start with a pure or substantially pure product. This constituted somewhat of a practical manufacturing problem. The known method of producing pure 2-carbalkoxycyclopentanone from dialkyl adipates involved a Dieckmann condensation in the presence of large amounts of a solvent, such as toluene. A reaction mixture is produced which contains the unreacted dialkyl adipate and other impurities. It cannot be used practically as a raw material and so must be purified, which involves an expensive distillation to separate from the large volumes of solvent and from the unreacted raw material. A product of excellent purity finally results, but the cost is high and in another aspect of the present invention, an improved process of transforming a dialkyl adipate into 2-carbalkoxycyclopentanone is included. Physically, the improved process does not involve a smaller number of steps, but the steps are easier and the cost is lower. Essentially, the process involves reaction of the dialkyl adipate in a comparatively small amount of a solvent, such as dibutyl ether, with alkali metal, such as sodium. The resulting sodium enolate is easily precipitated out, if necessary, with the addition of some ether and can then by hydrolyzed and the final product recovered by extraction with ether or other solvent. No difficult and expensive fractional distillation is needed and a product of excellent purity is obtained at a very marked saving in cost. Of course, in its aspect of producing 2-oxoadipic acid from 2-carbalkoxycyclopentanone, the present invention is not limited to a raw material which is prepared by the improved process described immediately above. However, in a more specific aspect, the above process improvement is included.

The differences of the improved process of the present invention and that described in our copending application are illustrated in the following flowsheet.

FLOWSHEET

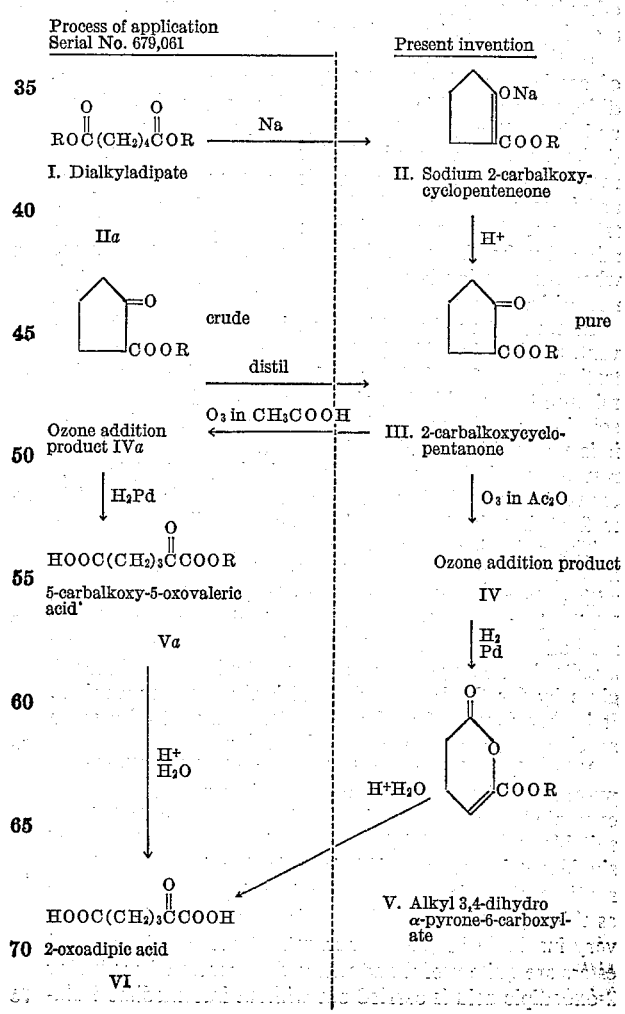

It is an advantage of the present invention that in most of the steps, conditions are not critical except in the ozonolysis step which must, without fail, be carried out in acetic anhydride in order to obtain the advantages of the present invention and to produce the new intermediates included therein. Starting at the beginning, the improved method of producing pure 2-carbalkoxycyclopentanone can be carried out in the presence of a small amount of solvent which essentially is for the purpose of maintaining a stirrable mixture. Relatively small amounts from 1 to 2 volumes of any suitable solvent, such as dibutyl ether, may be used or a comparable excess of the alkyl adipate is useful. Naturally, of course, the two may be combined, that is to say there may be an excess of the adipate and a smaller amount of additional solvent. The alkali metal used is not critical, either sodium or potassium being effective. However, because of its far lower cost and smoother reaction, sodium is preferred. The exact amount of sodium is not critical. There must, of course, be sufficient sodium to produce the sodium enolate and normally an equimolar amount is helpful in order to insure that the reaction proceeds to reasonable completion. Of course, when an excess of the dialkyl adipate is used, in order to maintain a fluid mixture the amount of sodium will be less than stoichiometric based on the total amount of ester used, although it will be at least stoichiometric based on the amount of ester reacted.

In order to effect a smooth separation by filtration of the sodium enolate from the reaction medium, it is desirable that the medium be somewhat diluted which can be easily effected by the addition of ether. Since the dilution does not require special solvent effects, the particular diluent is of little consequence, and as diethyl ether is cheaper than dibutyl ether, in practical operation a saving can be effected by using the cheaper reagent.

In the ozonolysis step, as pointed out above, the use of acetic anhydride is critical. However, the other conditions are not critical. An alkaline catalyst is desirable and the sodium salt of the ketone is useful. However, if desired, small traces of alkali, such as sodium alkoxide, may be added. Ozone absorption is usually quantitative and is generally stopped when a mole of ozone has been taken up. This is not critical and can be readily determined by the change to the blue color of dissolved ozone when the reaction is completed. The temperature also is not critical and room temperature gives excellent results.

In contrast to the criticality of the nature of the solvent, acetic anhydride, in the ozonolysis step, the concentration of the 2-carbalkoxycyclopentanone in the reaction mixture is not critical at all. Concentrated or very dilute solutions can be used. Of course, as a practical matter, it is undesirable to dilute beyond the point of optimum results as this involves a waste of acetic anhydride. A convenient practical range of concentration is from 10% to 20% but the invention is in no sense limited thereto.

The reduction of the ozone reaction product presents little difficulty. The reaction is mildly exothermic but with only reasonable care, there is no explosion hazard. While the present invention is not limited to a particular method of reduction, hydrogenation with hydrogen over a palladium catalyst, for example palladium on charcoal, gives by far the best results and is the most convenient. It is therefore preferred and so forms a part of a more specific aspect of the present invention.

When it is desired to isolate the alkyl-3,4-dihydro-α-pyrone-6-carboxylate, this can be suitably effected, as for example by recrystallization, carbon tetrachloride being a suitable solvent. While the particular ester is not of significant importance, if it is desired to isolate the intermediate, there is an advantage in using the methyl ester as this crystallizes sharply and is very soluble in hot and very insoluble in cold carbon tetrachloride. Other alkyl esters are quite useful and where the process of producing 2-oxoadipic acid is carried out without intermediate isolation and purification of the pyrone carboxylate, the particular alkyl group is of no practical significance. Because of their low cost, of course the methyl and ethyl adipates constitute the best raw material and hence are preferred.

The hydrolysis of the pyrone carboxylate to 2-oxoadipic acid proceeds with great ease on the acid side. Dilute hydrochloric acid gives practically quantitative yields of nearly pure acid. Alkaline hydrolysis, while it can be used, does not give as good yields or produce initially quite as pure products. Therefore, although not limiting the invention, the acid hydrolysis is distinctly preferable from practical operating standpoint.

The invention will be described in greater detail in conjunction with the following specific examples in which the parts are by weight unless otherwise specified.

EXAMPLE 1

*Preparation of 2-carbomethoxycyclopentanone*

One mole of dimethyl adipate and an equal weight of dibutyl ether are heated to reflux and one mole of sodium cut into small pieces was gradually added. The mixture thickened up and further amounts of dibutyl ether were added to maintain it in stirrable consistency, the total approximating twice the original weight of dibutyl ether. After the reaction is complete, the medium is allowed to cool. It was still quite thick, though stirrable, and ethyl ether was added in an amount approximately one and one-half times the volume of the dibutyl ether. The sodium enolate was filtered off and washed with some additional ethyl ether. On drying, a free flowing powder was produced.

The sodium enolate produced above was added to a reaction mixture having 12 N hydrochloric acid, water and ice in the proportion of 83 parts of hydrochloric acid, 200 parts of water and an equal amount of ice. The mixture was stirred until the solid sodium enolate disappeared, being transformed into an oil. This oil had a higher specific gravity than water and settled out at the bottom of the reaction vessel. It was recovered by extraction with ethyl ether which was dried and distilled off. The residue constituted a product of satisfactory purity for further processing.

EXAMPLE 2

*Preparation of 2-carbomethoxycyclopentanone*

The moles of dimethyl adipate were heated with stirring to 125° C. and one mole of sodium cut into small pieces was gradually added. The reaction was vigorous and exothermic and stirring was maintained at the same temperature after the addition of all of the sodium until the reaction was substantially complete. The methanol produced in the reaction was then distilled out and the reaction mixture allowed to cool. As in Example 1, dibutyl ether was added in the amount of about one and one-half times by volume. The yield was slightly more than 100% based on the sodium and after removal of the ether and unreacted dimethyl adipate, an excellent yield resulted based on the dimethyl adipate consumed.

The sodium enolate was then treated with hydrochloric acid as described in Example 1 and 2-carbomethoxycyclopentanone of good purity was obtained.

EXAMPLE 3

*Preparation of methyl 3,4-dihydro-α-pyrone-6-carboxylate*

A solution of 28.43 grams (0.2 mole) of 2-carbomethoxycyclopentanone in 175 ml. of acetic anhydride was placed in an ozonizor and an ozone-oxygen stream containing 1.4 millimoles of ozone per liter was introduced at a rate of 0.06 cu. ft./minute. The absorption of ozone was rapid and no ozone appeared in the exit gas until 179 millimoles had been added. After 194 millimoles, the leak was 5 mg. ozone per liter of exit gas and the reaction was considered complete. The oxygen was then swept out with a stream of nitrogen and 0.5 gram of 10% palladium on charcoal hydrogenation catalyst was added. A slow stream of hydrogen was then bubbled through the solution at the same temperature (room temperature) as was maintained during the ozonolysis. The hydrogenation was continued until a test for peroxide was negative. The hydrogenation catalyst was filtered off. The pressure on the vessel was then reduced to 30 mm. and the acetic anhydride distilled off. The residue was then vacuum distilled at 0.01 mm. and pure methyl 3,4-dihydro-α-pyrone-6-carboxylate was obtained.

EXAMPLE 4

*Preparation of 2-oxoadipic acid*

22.2 grams of the product of Example 3 (0.129 mole) was then hydrolyzed by heating on a steam bath with 250 ml. of 4 N hydrochloric acid until the reaction appeared complete. The mixture was then cooled and allowed to stand. Decolorization with a little activated carbon was then effected and the solvent evaporated leaving 0.127 mole (98.5%) of white crystalline for 2-oxoadipic acid.

EXAMPLE 5

*Preparation of 2-oxoadipic acid*

2.8 grams of the product of Example 3 in 20 ml. of water was heated on a steam bath, cooled and an equal weight of sodium bicarbonate added. The solution was again heated on the steam bath, cooled and extracted with 10 ml. of nitromethane. The nitromethane did not remove any non-volatile product. The aqueous layer was acidified with concentrated hydrochloric acid and heated on a steam bath. The solvent was evaporated under reduced pressure and the residue extracted with 20 ml. of hot nitromethane. Crystals were produced and evaporation of the mother liquor left some oil. The oil and crystals were combined, heated on a steam bath with 15 ml. of 4 N hydrochloric acid, the solution decolorized with activated charcoal and evaporated to dryness. The residue was washed with benzene and recrystallized from nitromethane. The yield was not as high as in Example 4 and before recrystallization, the product was considerably less pure.

EXAMPLE 6

*Preparation of ethyl 3,4-dihydro-α-pyrone-6-carboxylate*

A solution of 0.21 gram mole of 2-carbethoxycyclopentanone in 250 ml. acetic anhydride was ozonized after the addition of 1 gram of the sodium salt of 2-carbethoxycyclopentanone as a catalyst. The ozone absorption was rapid and quantitative until 0.187 mole had been absorbed. The ozone was stopped when 0.2 mole had been absorbed and the excess of ozone and oxygen swept out with nitrogen. Reduction with hydrogen and the palladium charcoal catalyst was then effected as described in Example 3. The catalyst filtered off, acetic anhydride removed by vacuum distillation and the product recrystallized from carbon tetrachloride. Pure ethyl 3,4-dihydro-α-pyrone-6-carboxylate was produced.

EXAMPLE 7

*Production of 2-oxoadipic acid*

The procedure of Example 6 was repeated through the removal of the catalyst and acetic anhydride. The crude product remaining, about 30 g., was hydrolyzed in 200 ml. of water containing 10 ml. of 12 N HCl. A yellow solution resulted which was decolorized with activated carbon and evaporated to dryness, producing crude 2-oxoadipic acid which was then washed with 2 ml. of dry ethyl ether per gram. Pure 2-oxoadipic acid was produced.

EXAMPLE 8

*Preparation of 2-oxoadipic acid*

0.2 gram mole of 2-carbomethoxycyclopentanone was dissolved in 175 ml. of acetic anhydride. The solution was ozonolized as described in Example 3 and the palladium catalyst of acetic anhydride removed. The crude reaction mixture containing methyl 3,4-dihydro-α-pyrone-6-carboxylate, and which represented a substantially quantitative yield, was hydrolyzed by heating on a steam bath with a solution of 200 ml. of water and 20 ml. concentrated hydrochloric acid. The diluted acid was then distilled off, leaving crude crystalline 2-oxoadipic acid which was slurried in 150 ml. of benzene, filtered and the cake washed with benzene. The product was then washed with 50 ml. of dry ethyl ether and practically analytically pure 2-oxoadipic acid was obtained.

EXAMPLE 9

*Preparation of methyl 3,4-dihydro-α-pyrone-6-carboxylate directly from the sodium enolate salt*

Thirty-three parts of crude sodium salt of 2-carbomethoxycyclopentanone was shaken with a mixture of 50 parts of water which contain 2 parts of acetic acid by volume and 10 parts of nitromethane. The salt dissolved readily and two liquid layers were produced which separated. The nitromethane layer was removed and the aqueous layer was extracted a second time with the same amount of nitromethane. The nitromethane layers were then combined and the solvent evaporated producing 2-carbomethoxycyclopentanone in the form of a crude product which was transferred into an ozonizor and ozonized as described in Example 3, followed by hydrogen reduction. The product was purified by recrystallization from carbon tetrachloride and pure 3,4-dihydro-α-pyrone-6-carboxylate was obtained.

EXAMPLE 10

*Preparation of methyl 3,4-dihydro-α-pyrone-6-carboxylate in situ from the sodium salt of 2-carbomethoxycyclopentanone*

32.8 grams of crude sodium 2-carbomethoxycyclopentanone were mixed with 24 grams of acetic acid, 160 ml. of acetic anhydride and an additional 150 ml. of acetic acid. The mixture did not entirely dissolve. The mixture was ozonized at 10° C. as described in Example 3 except for the lower temperature and stopped when 0.2 mole of ozone was absorbed. The ozone was then swept out with nitrogen and reduction with hydrogen and palladium on charcoal catalyst carried out as described in Example 3 until a peroxide test was negative. The catalyst was filtered off, the solvents evaporated and the product recrystallized from carbon tetrachloride. Pure methyl 3,4-dihydro-α-pyrone-6-carboxylate was obtained.

We claim:

1. Unsubstituted lower alkyl esters of 3,4-dihydro-α-pyrone-6-carboxylic acid.
2. Methyl 3,4-dihydro-α-pyrone-6-carboxylate.
3. Ethyl 3,4-dihydro-α-pyrone-6-carboxylate.
4. A process for producing 2-oxoadipic acid which comprises ozonizing 2-carbo lower alkoxy cyclopentanone in acetic anhydride to produce an ozone reaction product containing substantially one mole of ozone, reducing the ozone reaction product with hydrogen in the presence of a hydrogenation catalyst to produce unsubstituted lower alkyl esters of 3,4-dihydro-α-pyrone-6-carboxylic acid, removing hydrogenation catalyst and acetic anhydride and subjecting the remaining reaction mixture to mineral acid hydrolysis to produce 2-oxoadipic acid.
5. A process according to claim 4 in which the hydrolysis is a hydrochloric acid hydrolysis.
6. A process for producing 2-oxoadipic acid which comprises hydrolyzing at a temperature below 110° C. unsubstituted lower alkyl esters of 3,4-dihydro-α-pyrone-6-carboxylic acid with a member of the group consisting of mineral acids and alkali metal bicarbonates until hydrolysis is substantially complete.

7. A process according to claim 6 in which the starting material is methyl-3,4-dihydro-α-pyrone-6-carboxylate.

8. A process according to claim 6 in which the starting material is ethyl-3,4-dihydro-α-pyrone-6-carboxylate.

9. A process according to claim 6 in which the hydrolysis is a mineral acid hydrolysis.

10. A process according to claim 7 in which the hydrolysis is a mineral acid hydrolysis.

11. A process according to claim 8 in which the hydrolysis is a mineral acid hydrolysis.

References Cited in the file of this patent

UNITED STATES PATENTS 1,921,101    Schrauth _____ Aug. 8, 1933

OTHER REFERENCES

Dieckmann: Deut. Chem. Gesell., Berichte, vol. 27, p. 103 (1894).

Kuehl et al.: Chem. Abst., vol. 45, p. 3330C (1955).

Justoni et al.: Chem. Abstr., vol. 51, p. 13931g (1957).